United States Patent
Baek

(10) Patent No.: US 12,022,317 B2
(45) Date of Patent: Jun. 25, 2024

(54) V2X COMMUNICATION DEVICE AND MULTI-CHANNEL CONGESTION CONTROL METHOD THEREOF

(71) Applicant: LG ELECTRONICS INC., Seoul (KR)

(72) Inventor: Jongseob Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 374 days.

(21) Appl. No.: 17/285,383

(22) PCT Filed: Oct. 23, 2018

(86) PCT No.: PCT/KR2018/012553
§ 371 (c)(1),
(2) Date: Apr. 14, 2021

(87) PCT Pub. No.: WO2020/085522
PCT Pub. Date: Apr. 30, 2020

(65) Prior Publication Data
US 2021/0345156 A1    Nov. 4, 2021

(51) Int. Cl.
*H04W 28/02* (2009.01)
*H04W 4/40* (2018.01)
*H04W 72/52* (2023.01)
*H04W 72/56* (2023.01)

(52) U.S. Cl.
CPC ......... *H04W 28/0236* (2013.01); *H04W 4/40* (2018.02); *H04W 28/0289* (2013.01); *H04W 72/52* (2023.01); *H04W 72/56* (2023.01)

(58) Field of Classification Search
CPC ... H04W 28/0236; H04W 4/40; H04W 72/56; H04W 72/52; H04W 28/0289
See application file for complete search history.

(56) References Cited

U.S. PATENT DOCUMENTS

| | | | |
|---|---|---|---|
| 9,154,260 B2 * | 10/2015 | Chen | ................ H04L 1/008 |
| 2012/0236736 A1 | 9/2012 | Frank et al. | |
| 2017/0272971 A1 | 9/2017 | Boban | |
| 2018/0184442 A1 | 6/2018 | Bai et al. | |

(Continued)

FOREIGN PATENT DOCUMENTS

WO    2017176098    10/2017

OTHER PUBLICATIONS

Wonjae Yi, "A New Congestion Control Algorithm for Vehicle to Vehicle Safety Communications," Journal of the Korea Academia-Industrial Cooperation Society, vol. 18, No. 5, pp. 125-132, May 31, 2017, See pp. 125-129.

*Primary Examiner* — Won Tae C Kim
(74) *Attorney, Agent, or Firm* — BRYAN CAVE LEIGHTON PAISNER LLP

(57) ABSTRACT

Disclosed is a multi-channel congestion control method considering adjacent channel interference (ACI). The multi-channel congestion control method includes configuring an interference observation window (IOW) based on the ACI of a transmission channel; acquiring channel busy ratio (CBR) information for multi-channels covered by the IOW; configuring a reference CBR for congestion control based on the CBR information for the multi-channels; and performing the congestion control for the transmission channel based on the reference CBR.

6 Claims, 12 Drawing Sheets

(56) References Cited

U.S. PATENT DOCUMENTS

2019/0200366 A1* 6/2019 Park .................... H04W 72/542
2020/0344643 A1* 10/2020 Zhou .................... H04W 76/14
2021/0258830 A1* 8/2021 Baek .................... H04W 72/569

* cited by examiner

[FIG. 1]
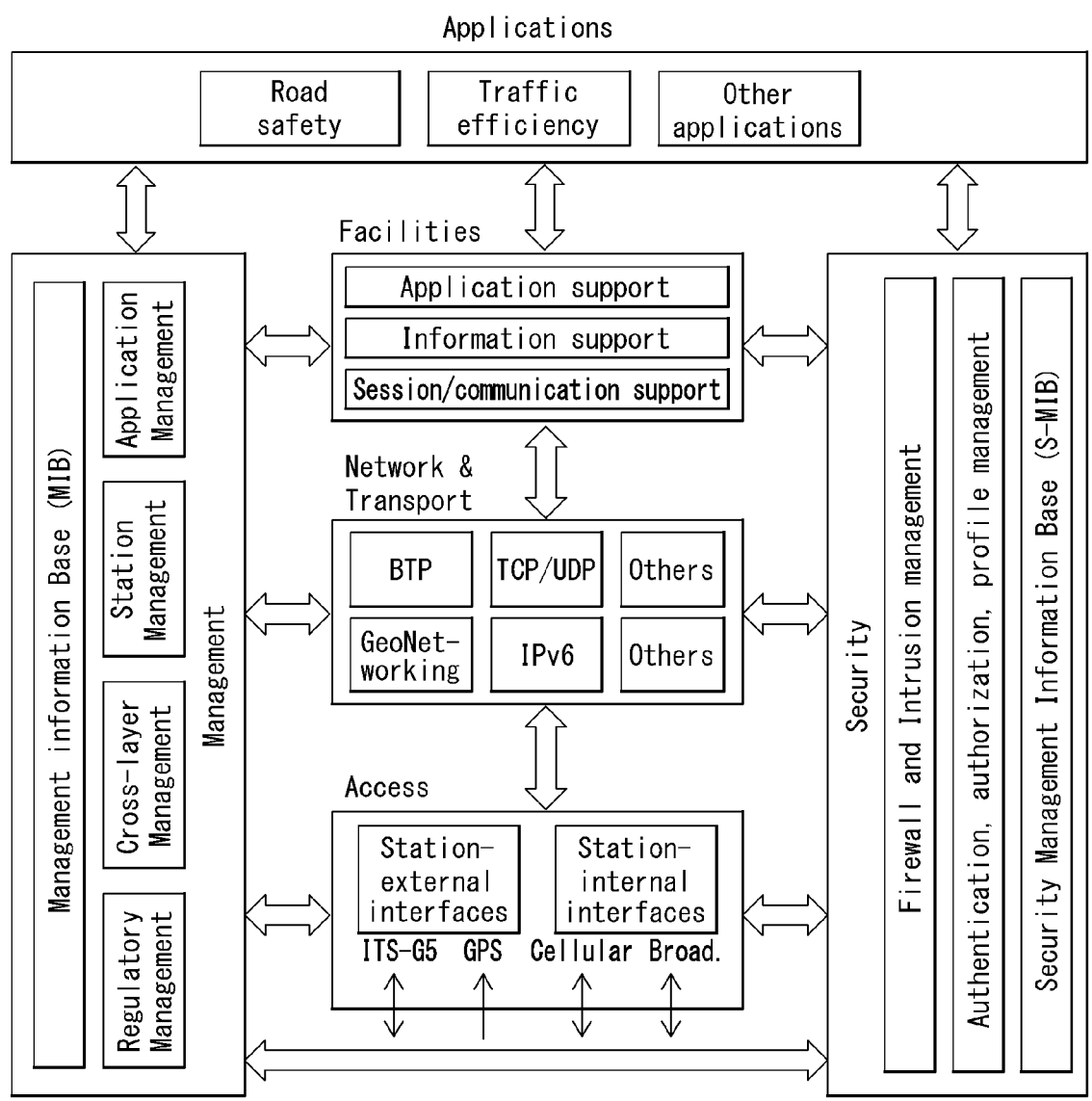

[FIG. 2]
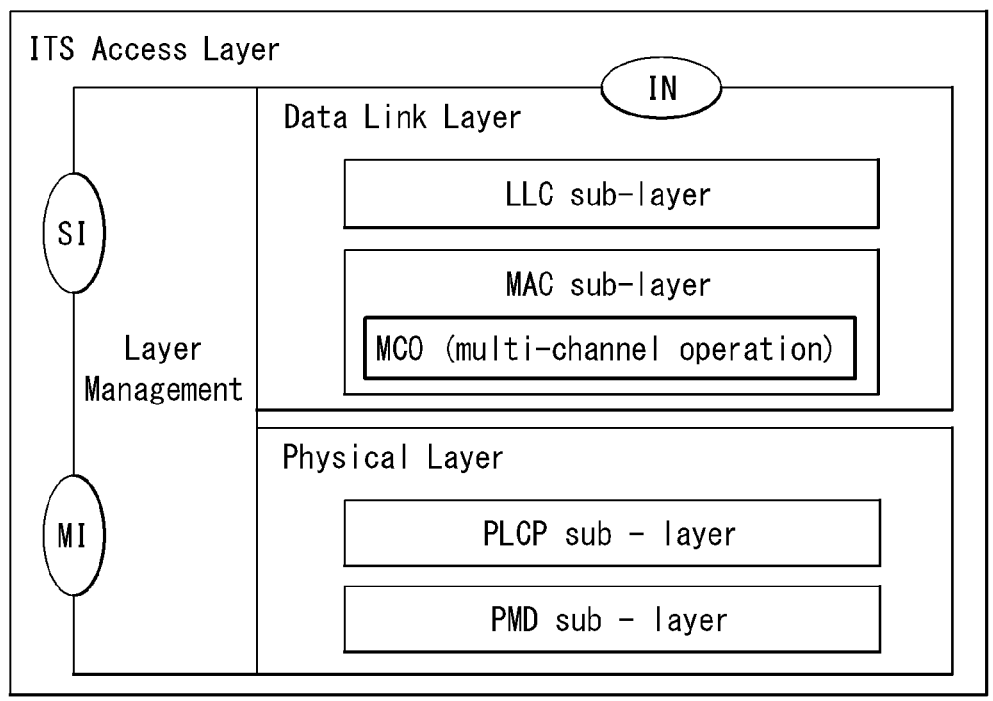

[FIG. 3]
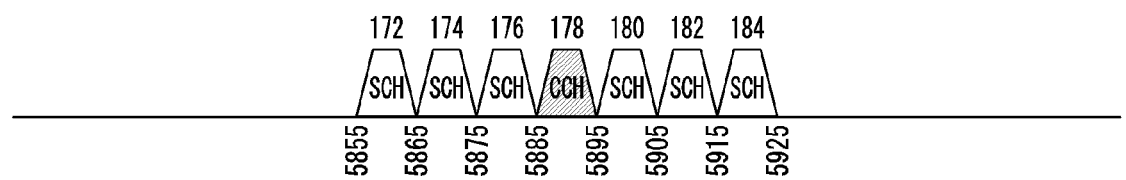
(a)
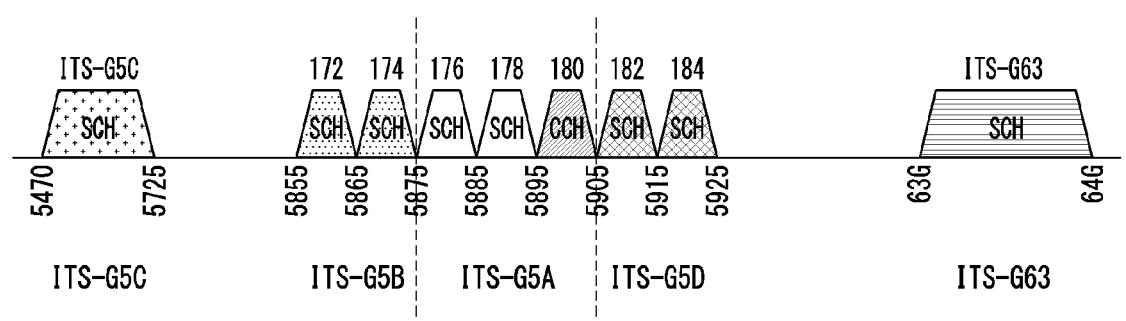
(b)

[FIG. 4]
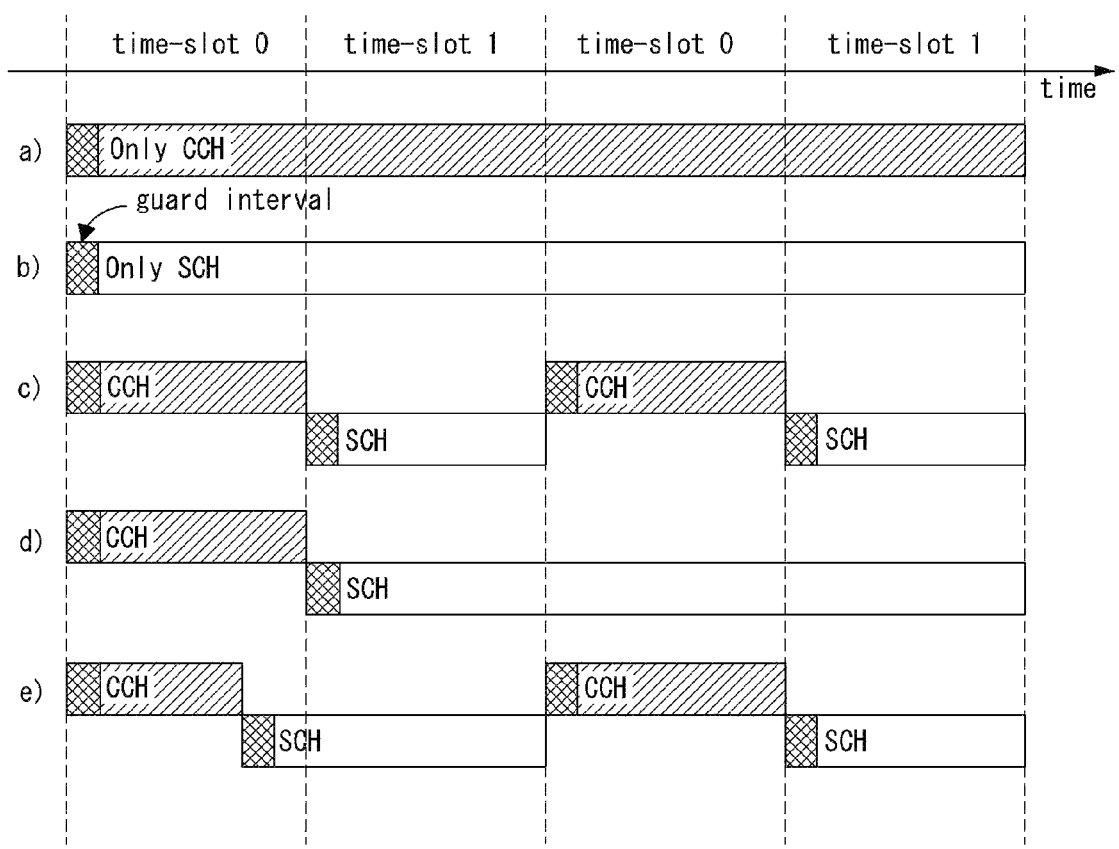

[FIG. 5]
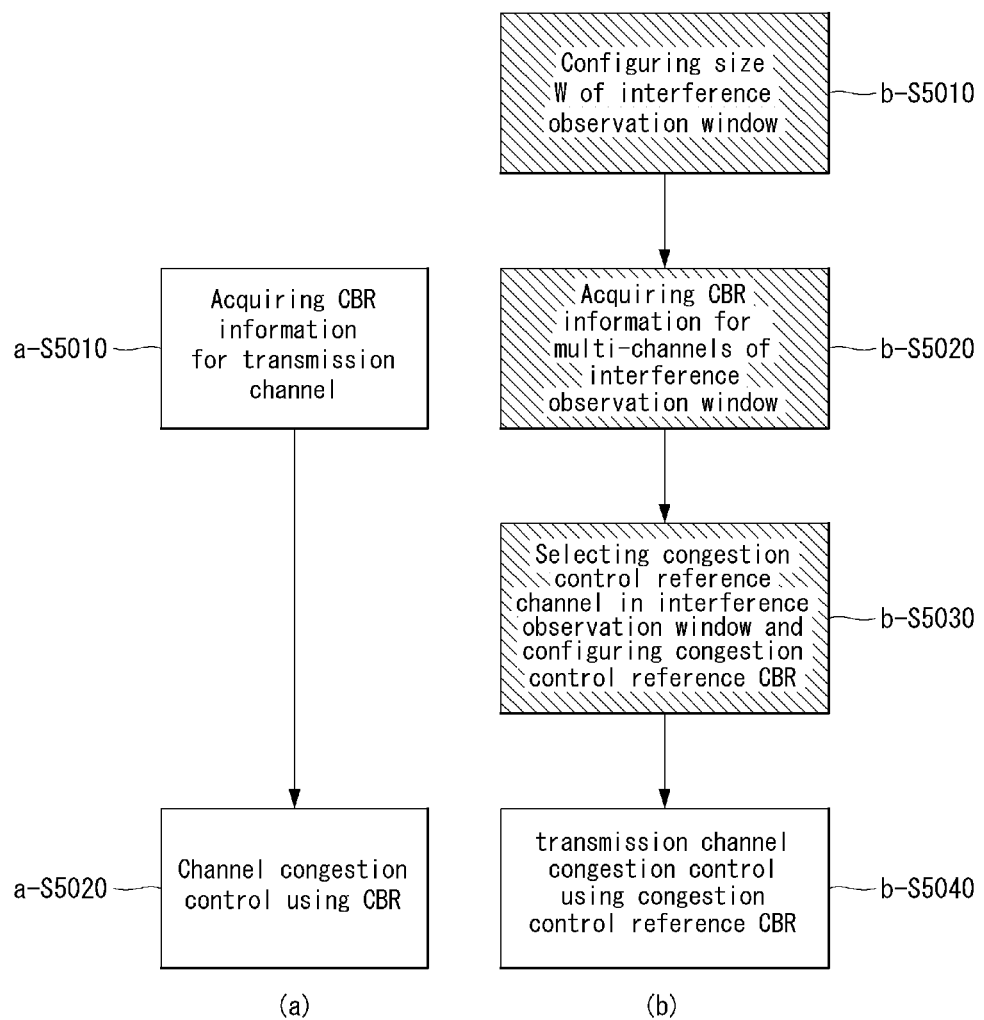

[FIG. 6]
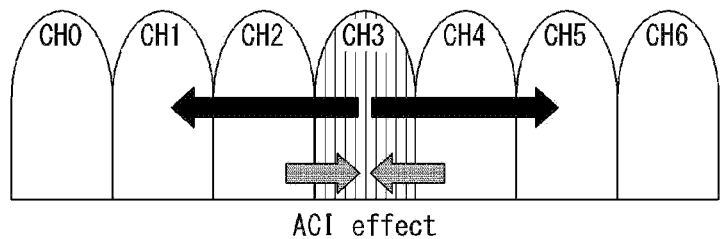

[FIG. 7]
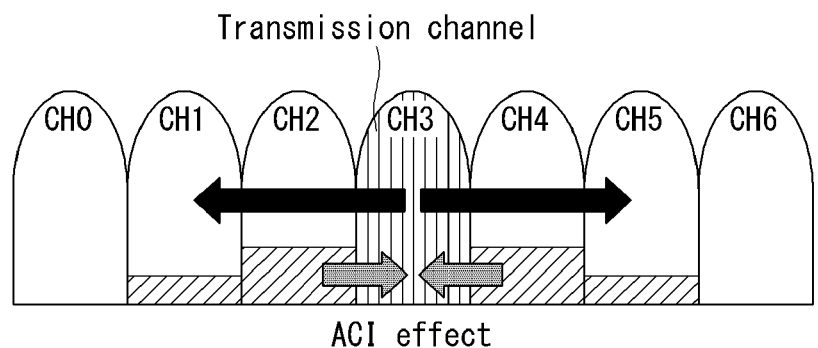
(a)
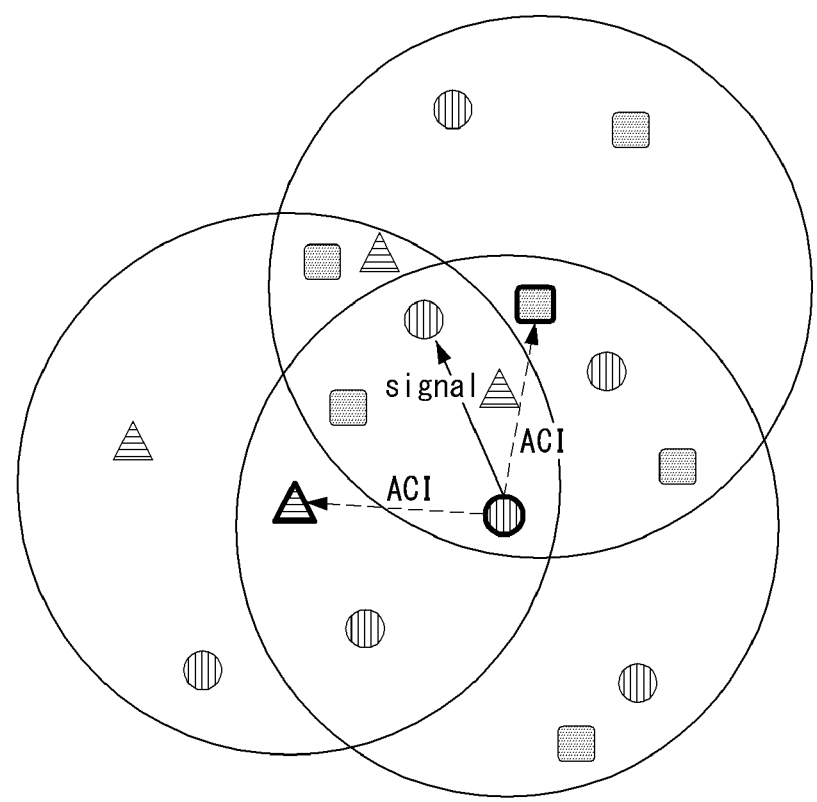
(b)

[FIG. 8]
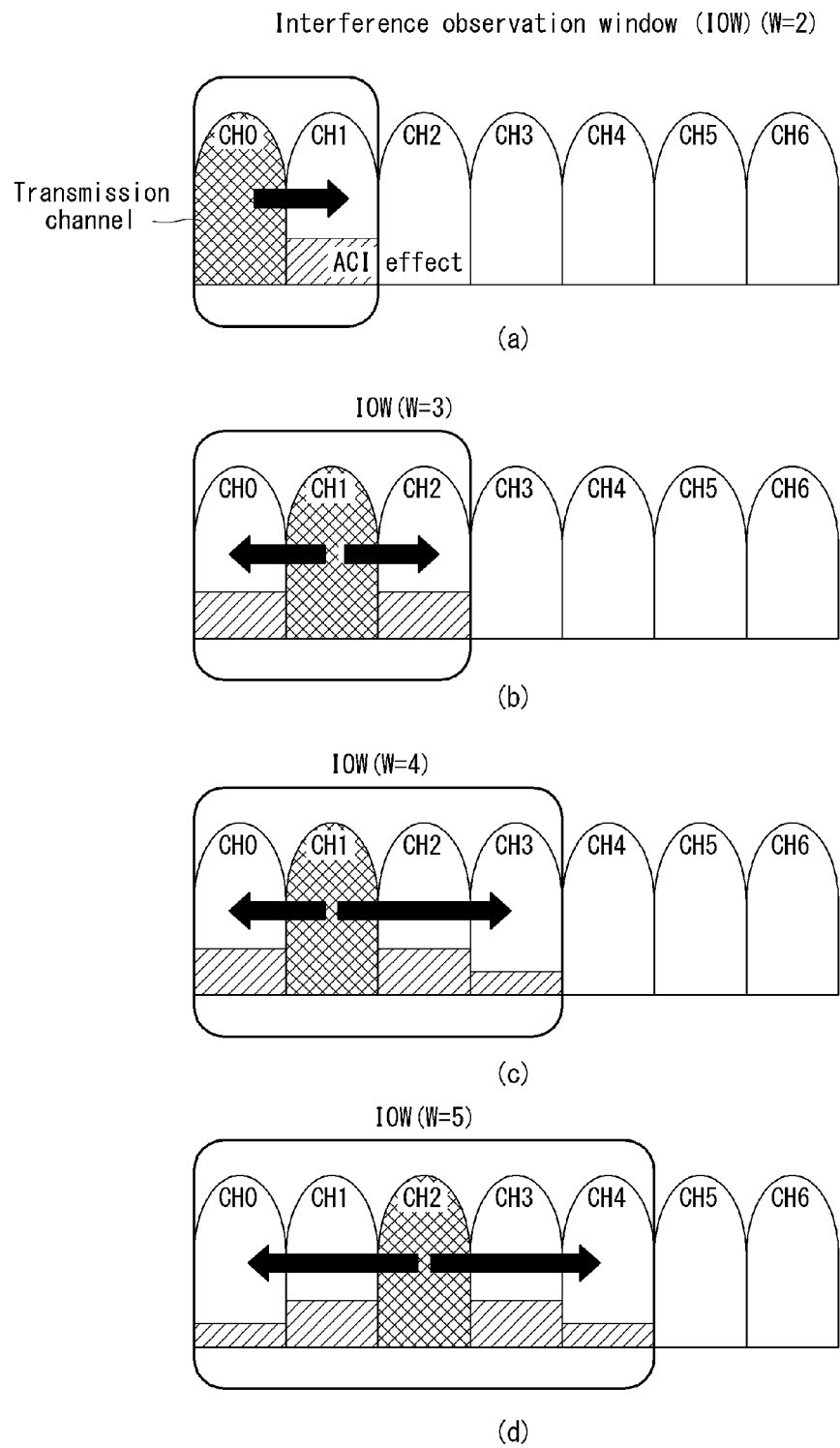

[FIG. 9]
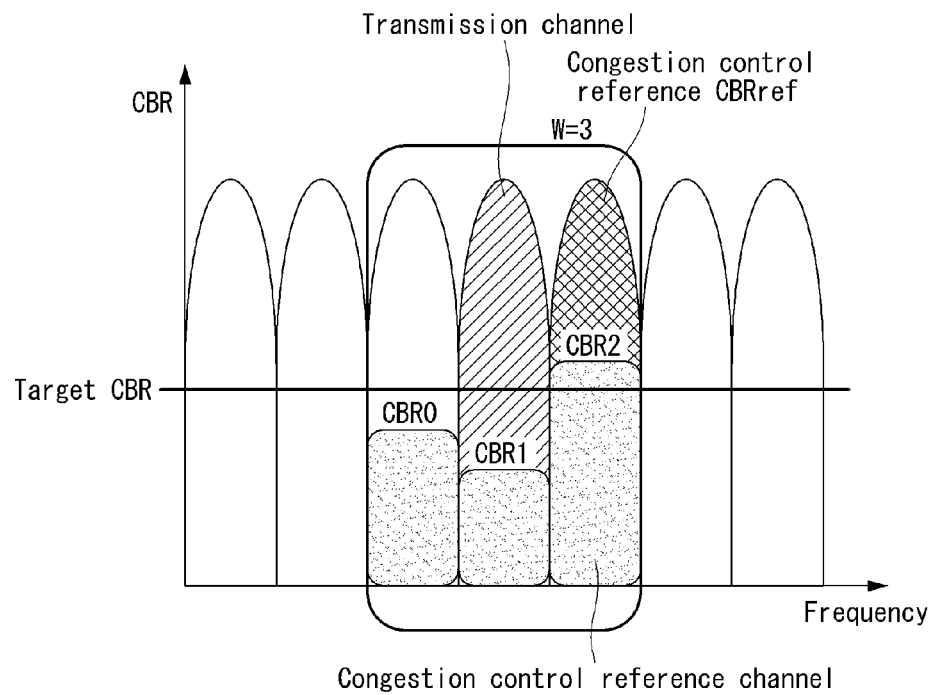
[FIG. 10]
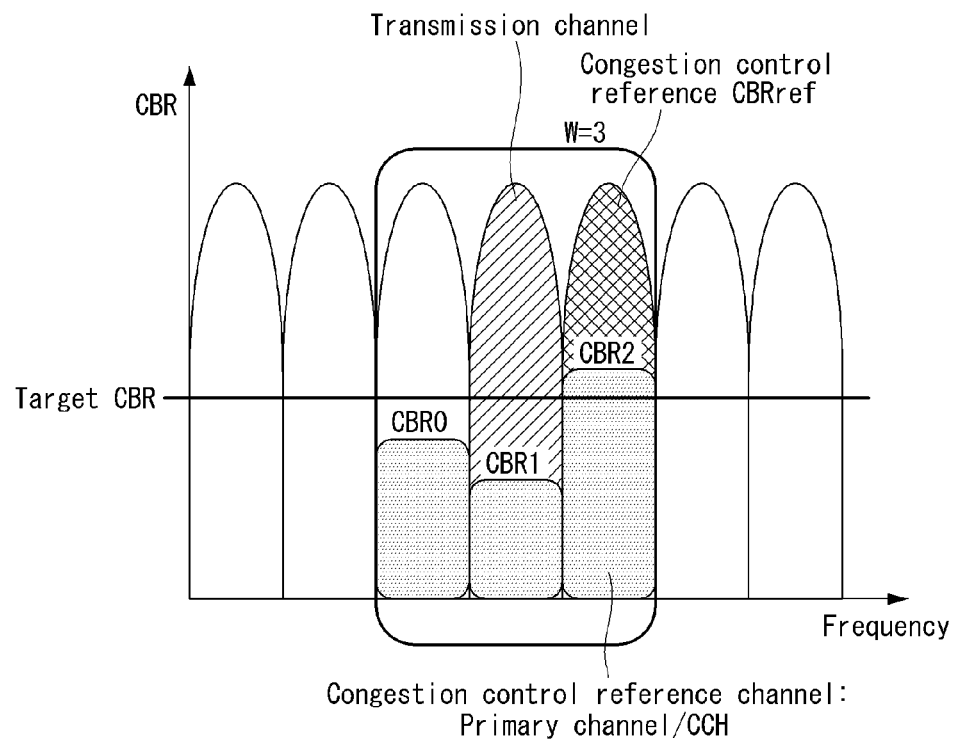

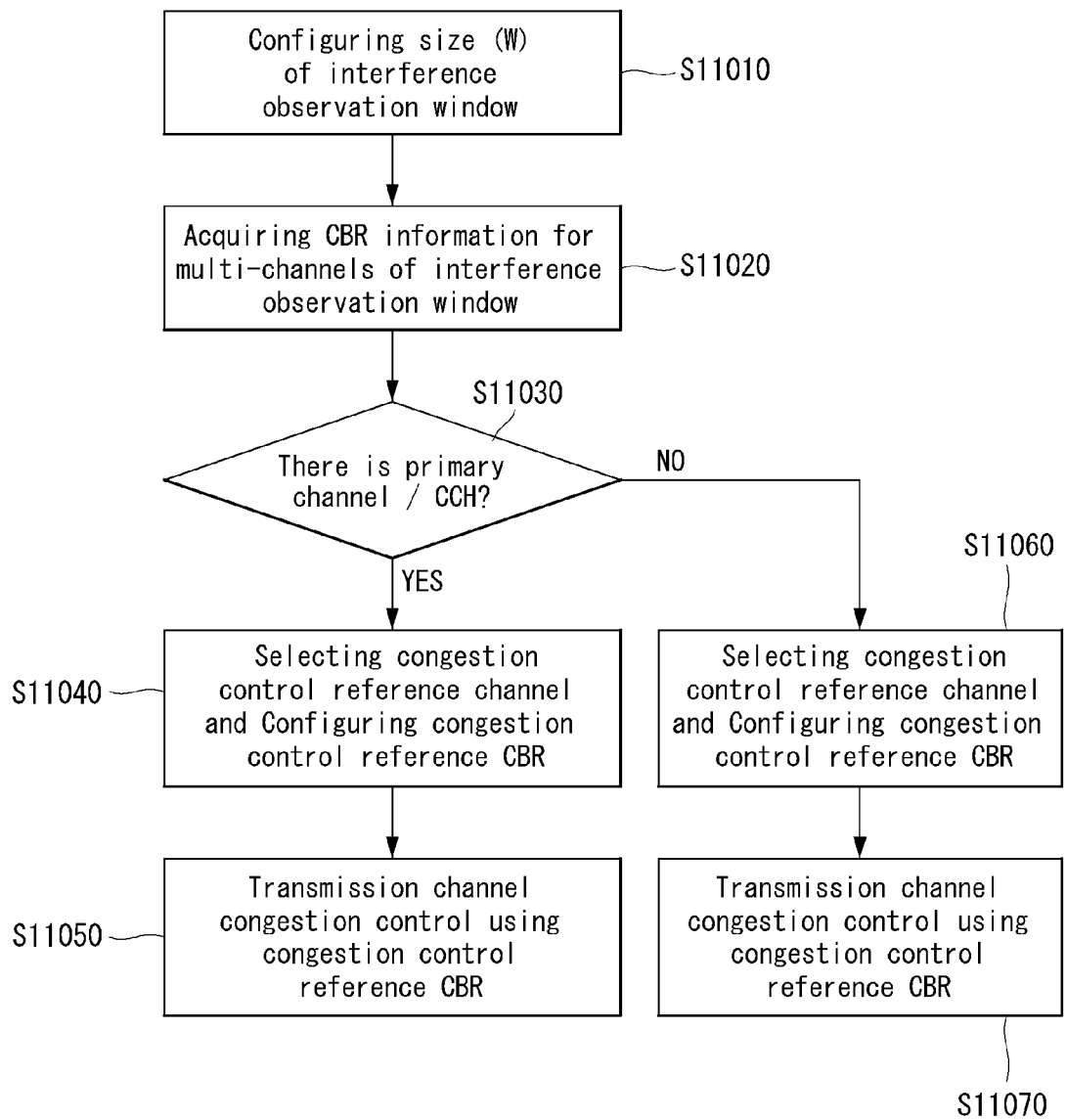
[FIG. 11]

[FIG. 12]
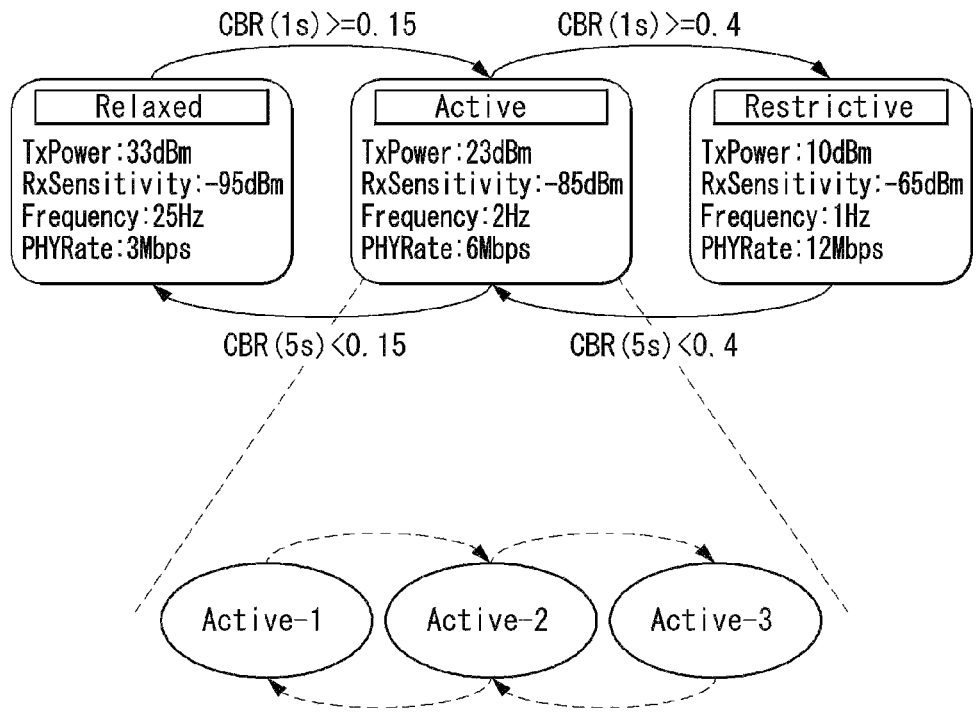
[FIG. 13]
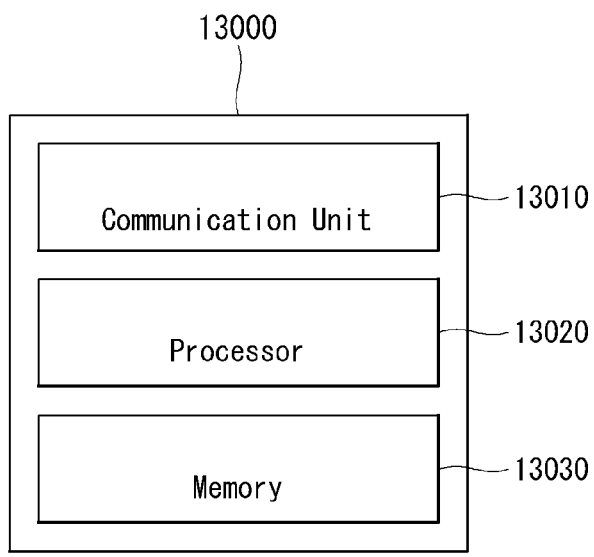
V2X Communication Device

[FIG. 14]
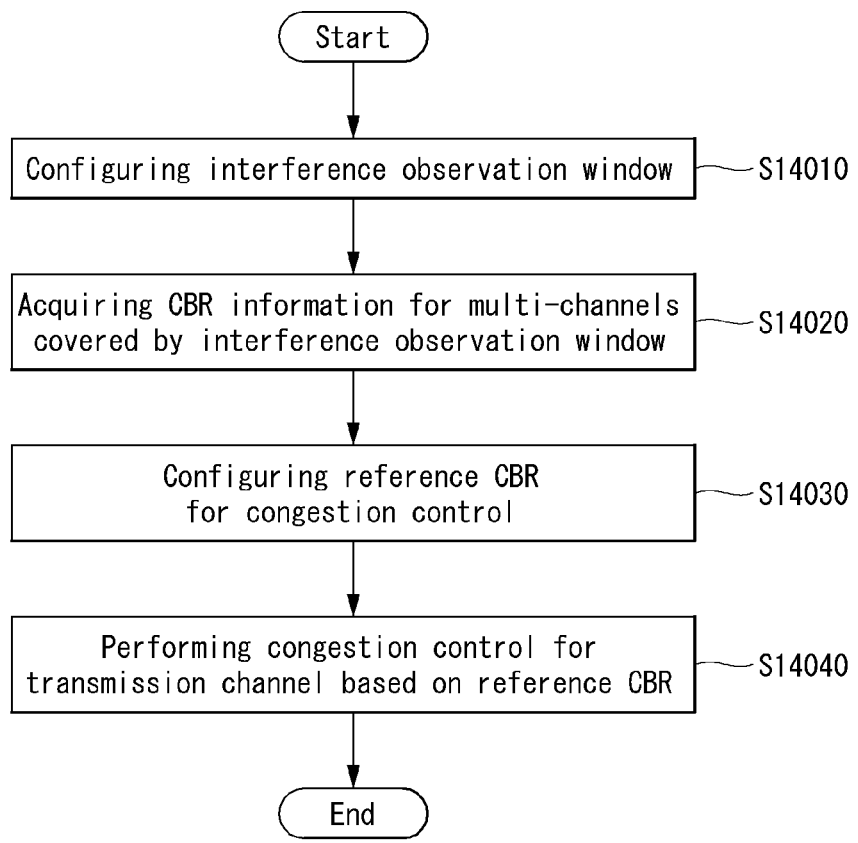

V2X COMMUNICATION DEVICE AND MULTI-CHANNEL CONGESTION CONTROL METHOD THEREOF

This application is the National Stage filing under 35 U.S.C. 371 of International Application No. PCT/KR2018/012553, filed on Oct. 23, 2018, the contents of which is hereby incorporated by reference herein in its entirety.

TECHNICAL FIELD

The present disclosure relates to a V2X communication device and a multi-channel congestion control method thereof, and particularly, to a multi-channel congestion control method considering influence/problem of adjacent channel interference (ACI) in a multi-channel environment.

BACKGROUND ART

Recently, a vehicle has become an output of complex industry technology in which electric, electronic and communication technologies are converged out of a mechanical engineering base. In this aspect, the vehicle is also called a smart car. The smart car has become provided various user-customized mobile services as well as the vehicle technology having a traditional meaning, such as traffic safety/congestion solution by connecting a driver, vehicle, transportation infra, etc. Such connectivity may be implemented using a vehicle to everything (V2X) communication technology. Connectivity may be implemented various V2X communication technologies, such as Europe ITS-G5, U.S. WAVE, and a new radio (NR). NR may include new communication technology between vehicles including cellular V2X, such as LTE-V2X and 5G-V2X which are developed in the future.

Furthermore, designs of a multi-channel operation (MCO) scheme using a plurality of channels are actively in progress to provide various V2X services and distribute V2X traffic load. In particular, researches on methods of channel selection, channel management, and channel operation in consideration of traffic load/load of each channel, quality of each channel, type of service provided, and priority are becoming important.

DETAILED DESCRIPTION OF INVENTION

Technical Problem

Most of the conventional or ongoing multi-channel operation schemes do not consider various problems that may be caused when using adjacent channels, or consider multi-channel operation schemes that do not cause problems between adjacent channels. Accordingly, the present disclosure proposes a method for efficiently controlling a multi-channel traffic congestion problem in consideration of the ACI effect/problem that occurs because the transmit/receive band filter of each channel is not ideal when operating multi-channels.

Technical Solution

In order to solve the above technical problem, a multi-channel congestion control method considering adjacent channel interference (ACI) is disclosed. A multi-channel congestion control method according to an embodiment of the present disclosure includes configuring an interference observation window (IOW) based on the ACI of a transmission channel; acquiring channel busy ratio (CBR) information for multi-channels covered by the IOW; configuring a reference CBR for congestion control based on the CBR information for the multi-channels; and performing the congestion control for the transmission channel based on the reference CBR.

In the multi-channel congestion control method according to an embodiment of the present disclosure, the configuring a reference CBR may further include configuring a reference channel for the congestion control, and wherein the reference channel may correspond to one of the multi-channels covered by the IOW.

In the multi-channel congestion control method according to an embodiment of the present disclosure, when a target CBR of the multi-channels covered by the IOW is the same, a channel having a maximum CBR among the multi-channels may be configured as the reference channel, and a CBR of the reference channel may be configured as the reference CBR.

In the multi-channel congestion control method according to an embodiment of the present disclosure, a channel having a higher priority among the multi-channels may be configured as the reference channel, and a CBR of the reference channel may be configured as the reference CBR.

In the multi-channel congestion control method according to an embodiment of the present disclosure, When a priority of the multi-channels is the same, a channel having a maximum CBR among the multi-channels may be configured as the reference channel, and a CBR of the reference channel may be configured as the reference CBR.

In the multi-channel congestion control method according to an embodiment of the present disclosure, the IOW covers the transmission channel and at least one adjacent channel.

Advantageous Effects

According to the present disclosure, considering the ACI effect when operating multi-channels, transmission/use efficiency for all channels may be improved compared to congestion control that considers only the transmission channel.

DESCRIPTION OF DRAWINGS

The accompanying drawings, which are included herein as a part of the description to help understanding the present disclosure, provide embodiments of the present disclosure and describe the technical features of the present disclosure with the description below.

FIG. 1 illustrates reference architecture of an intelligent transport system (ITS) station according to an embodiment of the present disclosure.

FIG. 2 illustrates an ITS access layer according to an embodiment of the present disclosure.

FIG. 3 illustrates multi-channel allocation used for an ITS system operation according to an embodiment of the present disclosure.

FIG. 4 illustrates a channel coordination mode of multi-channel operation according to an embodiment of the present disclosure.

FIG. 5 illustrates a traffic congestion control method according to an embodiment of the present disclosure.

FIG. 6 illustrates an ACI effect of a single channel according to an embodiment of the present disclosure.

FIG. 7 illustrates an ACI effect when a service is transmitted using a plurality of channels according to an embodiment of the present disclosure.

FIG. 8 illustrates an interference observation window according to an embodiment of the present disclosure.

FIG. 9 illustrates a first congestion control reference channel selection method according to an embodiment of the present disclosure.

FIG. 10 illustrates a second congestion control reference channel selection method according to an embodiment of the present disclosure.

FIG. 11 is a flowchart illustrating a second congestion control reference channel selection method according to an embodiment of the present disclosure.

FIG. 12 illustrates a DCC state machine and a channel congestion control method thereof according to an embodiment of the present disclosure.

FIG. 13 illustrates a configuration of a V2X communication device according to an embodiment of the present disclosure.

FIG. 14 illustrates a multi-channel congestion control method of a V2X communication device according to an embodiment of the present disclosure.

BEST MODE FOR INVENTION

Preferred embodiments of the disclosure will be described in detail with reference to the accompanying drawings. The following detailed description with reference to the attached drawings illustrates preferred embodiments of the disclosure rather than illustrating only embodiments that may be implemented according to embodiments of the disclosure. The following detailed description includes details in order to provide a thorough understanding of the disclosure, but the disclosure does not require all of these details. In the disclosure, embodiments described hereinafter are not intended to be respectively used independently. Multiple embodiments or all embodiments may be used together, and specific embodiments may be used in combination.

Most of terms used in the disclosure are selected from general ones widely used in the art, but some terms are optionally selected by an applicant and meanings thereof are described in detail in the following description as needed. Accordingly, the disclosure should be understood based on the intended meaning of the term rather than a simple name or meaning of the term.

The disclosure relates to a V2X communication device, and the V2X communication device may be included in an Intelligent Transport System (ITS) to perform all or some of functions of the ITS system. The V2X communication device may perform communication with a vehicle and a vehicle, a vehicle and an infrastructure, a vehicle and a bicycle, and mobile devices. The V2X communication device may be abbreviated to a V2X device. In an embodiment, the V2X device may correspond to an On Board Unit (OBU) of a vehicle or may be included in an OBU. The V2X device may correspond to a Road Side Unit (RSU) of an infrastructure or may be included in an RSU. Alternatively, the V2X communication device may correspond to an ITS station or may be included in an ITS station. In an embodiment, the V2X device may operate in a Wireless Access In Vehicular Environments (WAVE) system of IEEE 1609.1 to 4.

FIG. 1 illustrates reference architecture of an Intelligent Transport System (ITS) station according to an embodiment of the disclosure.

In the architecture of FIG. 1, two end vehicles/users may communicate with a communication network, and such communication may be performed through a function of each layer of the architecture of FIG. 1. For example, when a message between vehicles is communicated, in a transmitting vehicle and an ITS system thereof, by passing through each layer below one layer, data may be transferred, and in a receiving vehicle and an ITS system thereof, by passing through each layer above one layer, data may be transferred. A description of each layer of the architecture of FIG. 1 is as follows.

Application layer: the application layer may implement and support various use cases. For example, the application may provide road safety, efficient traffic information, and other application information.

Facilities layers: the facilities layer may support to effectively realize various use cases defined at the application layer. For example, the facilities layer may perform application support, information support, and session/communication support.

Networking & Transport layer: the networking/transport layer may constitute a network for vehicle communication between homogenous/heterogenous networks by using various transport protocols and network protocols. For example, the networking/transport layer may provide Internet access and routing using an Internet protocol such as TCP/UDP+IPv6. Alternatively, the networking/transport layer may constitute a vehicle network using a geographical position based protocol such as Basic Transport Protocol (BTP)/GeoNetworking.

Access layer: the access layer may transmit a message/data received from a superordinate layer through a physical channel. For example, the access layer may perform/support data communication based on IEEE 802.11 and/or 802.11p standard based communication technology, ITS-G5 wireless communication technology based on IEEE 802.11 and/or 802.11p standard physical transmission technology, 2G/3G/4G(LTE)/5G wireless cellular communication technology including satellite/broadband wireless mobile communication, broadband terrestrial digital broadcasting technology such as DVB-T/T2/ATSC, GPS technology, and IEEE 1609 WAVE technology.

ITS architecture may further include a management layer and a security layer.

FIG. 2 illustrates an ITS access layer according to an embodiment of the disclosure.

FIG. 2 illustrates in more detail the ITS Access Layer of the ITS system of FIG. 1. The access layer of FIG. 2 may include a data link layer, a physical layer, and layer management. The access layer of FIG. 2 has characteristics similar to or identical to an OSI 1 layer (physical layer) and an OSI 2 layer (data link layer).

The data link layer may include a Logical Link Control (LLC) sub-layer, a Medium Access Control (MAC) sub-layer, and a Multi-channel operation (MCO) sub-layer. The physical layer may include a Physical Layer Convergence Protocol (PLCP) sub-layer and a Physical Medium Access (PMD) sub-layer.

In order to enable a superordinate network layer to use a physical line between adjacent nodes (or between vehicles) having noise, the data link layer may convert the physical line into a communication channel having no transmission error. The data link layer performs a function of transmitting/transporting/transferring a 3-layer protocol, a framing function of dividing and grouping data to transmit into a packet (or frame) as a transmission unit, a flow control function of compensating a speed difference between the sending side and the receiving side, and a function of detecting and modifying or retransmitting a transmission error. Further, the data link layer performs a function of giving a sequence number to a packet and an ACK signal in order to avoid to erroneously confuse the packet or the ACK signal and a function of controlling setting, maintaining, short-circuit, and data transmission of a data link between network entities. Furthermore, such a data link layer may include a logical link control (LLC) sub-layer and a medium access control (MAC) sub-layer based on IEEE 802 standard.

A main function of the LLC sub-layer is to enable to use several different sub-MAC sub-layer protocols to allow communication unrelated to topology of a network.

The MAC sub-layer may control occurrence of collision/contention between vehicles when several vehicles (or nodes or a vehicle and peripheral devices) use a shared medium. The MAC sub-layer may format a packet transferred from a superordinate layer to correspond to a frame format of the physical network. The MAC sub-layer may perform addition and identification functions of a sender address/recipient address, carrier detection, collision detection, and fault detection on a physical medium.

The physical layer: the physical layer may define an interface between a node and a transmission medium to a lowest layer on an ITS layer structure and perform modulation, coding, and mapping of a transmission channel to a physical channel for bit transmission between data link layer entities. Further, the physical layer performs a function of notifying the MAC sub-layer whether a wireless medium is being used (busy or idle) through carrier sense and clear channel assessment (CCA). Furthermore, such a physical layer may include a physical layer convergence protocol (PLCP) sub-layer and a physical medium access (PMD) sub-layer based on IEEE standard.

The PLCP sub-layer performs a function of connecting a data frame with the MAC sub-layer. By attaching a header to the received data, the PLCP sub-layer enables to operate the MAC sub-layer regardless of physical characteristics. Therefore, in the PLCP frame, a format thereof may be defined differently according to various different wireless LAN physical layer standards.

A main function of the PMD sub-layer may perform carrier/RF modulation of frames received from the PLCP sub-layer and then transmit the frames to a wireless medium according to transmission and reception transmission related standards.

Layer management performs a function of managing and servicing information related to an operation and security of an access layer. Information and service are bilaterally transferred and shared through MI (interface between management entity and access layer or MI-SAP) and SI (interface between security entity and access layer or SI-SAP). Two-way information and service transfer between the access layer and a network/transport layer is performed by IN (or IN-SAP).

The MCO sub-layer may provide various services such as a safety service and other services, i.e., a non-safety service other than the safety service using a plurality of frequency channels. By effectively distributing a traffic load in a particular frequency channel to other channels, the MCO sub-layer may minimize collision/contention when communicating between vehicles in each frequency channel. The MCO sub-layer may perform multi-channel access and operation to be described hereinafter based on setting received from the superordinate layer.

FIG. 3 illustrates multi-channel allocation used for an ITS system operation according to an embodiment of the disclosure.

FIG. 3(a) illustrates US spectrum allocation for an ITS, and FIG. 3(b) illustrates EP spectrum allocation for an ITS.

As shown in FIG. 3, the United States and Europe have seven frequencies (each frequency bandwidth: 10 MHz) in 5.9 GHz band (5.855 to 5.925 GHz). Seven frequencies may include one CCH and 6 SCHs. As shown in FIG. 3(a), in the United States, the CCH is allocated to a channel number 178 and as shown in FIG. 3(b), in European, the CCH is allocated to a channel number 180.

In Europe, in order to provide a service that is time-sensitive and having a large data capacity, it is considered to additionally use an ITS-G63 band in a superordinate frequency band based on 5.9 GHz and it is considered to use an ITS-G5 band in a subordinate frequency band. In order to provide a high quality of service by appropriately allocating the service to various multi-channels in such an environment, development of an efficient multi-channel operation method is required.

The CCH indicates a radio channel used for exchange of a management frame and/or a WAVE message. The WAVE message may be a WAVE short message (WSM). The SCH is a radio channel used for providing a service and represents a random channel instead of the CCH. In an embodiment, the CCH may be used for communication of a Wave Short Message Protocol (WSMP) message or communication of a system management message such as a WAVE Service Advertisement (WSA). The SCH may be used for general-purpose application data communication, and communication of such general-purpose application data may be coordinated by service related information such as the WSA.

Hereinafter, the WSA may be also referred to as service advertisement information. The WSA is an application may provide information including announcement of availability of an application-service. A WSA message may identify and describe an application service and a channel in which the service is accessible. In an embodiment, the WSA may include a header, service information, channel information, and WAVE routing advertisement information.

Service advertisement information for service access may be a periodic message. In an embodiment, Co-operative Awareness Messages (CAM) may be periodic messages. The CAM may be broadcasted periodically by a facilities layer. In an embodiment, the CAM may also be transmitted by the RSU, and in such a case, the CAM may be transmitted and received in an RSU interval hereinafter.

Decentralized Environmental Notification Messages (DENM) may be event messages. The event message may be triggered by detection of the event to be transmitted. Service messages may be transmitted to manage a session. In the following embodiments, the event message may include a security message/information. The service message may include a non-safety message/information.

A V2X communication device may broadcast a cooperative awareness message (CAM) or a decentralized environmental notification message (DENM).

The CAM is distributed in an ITS network, and provides information for at least one of the presence, location or communication state of an ITS station. The DENM provides information for a detected event. The DENM may provide information for a given driving situation or event detected by an ITS station. For example, the DENM may provide information for a situation, such as an emergency electronic brake lamp, a traffic accident, a vehicle problem, or a traffic condition.

FIG. 4 illustrates a channel coordination mode of multi-channel operation according to an embodiment of the present disclosure.

FIG. 4 illustrates one of channel coordination modes of multi-channel operation: (a), (b) continuous mode, (c) altering mode, (d) extended mode, and (e) immediate mode. The channel coordination mode may indicate a method for accessing a CCH and an SCH by a V2X device.

A V2X device may access at least one channel. As an embodiment, a single-radio device may monitor a CCH and exchange data via an SCH. To this purpose, a channel interval has to be specified, where FIG. 4 illustrates the channel interval, namely, time slot allocation. Radio channel altering may be operated based on an interval synchronized in association with a common time base. A sync interval may include a plurality of time slots. And a plurality of time slots may correspond to a CCH interval and an SCH interval. In this case, a sync interval may include a CCH interval and an SCH interval. During the CCH interval, traffic may be exchanged via the CCH. A single-radio device participating in an application service may switch to the SCH during the SCH interval. Each of the CCH interval and the SCH interval may include a guard interval. Each interval may start as a guard interval.

As an embodiment, exchange of multi-channel operation information and safety-related service information may be performed via the CCH during the CCH interval. Also, negotiation for exchange of information between a service provider and a user may be performed via the CCH during the CCH interval. A hardware timing operation for channel altering of the V2X device may be initiated by a sync signal obtained from Coordinated Universal Time (UTC)-based estimation. Channel synchronization may be performed at 1 Pulse Per Second (PPS) intervals based on the UTC.

As an embodiment, FIG. 4 illustrates a channel coordination method of Multi-Channel Operation (MCO) described in the IEEE 1609.4, where two MAC layers perform time division on one physical layer to use a CCH and the respective channel modes in an alternate manner.

(a) & (b) Continuous mode: In the continuous mode, each vehicle or all the vehicles operate independently of a time division reference such as the time slot/CCH interval/SCH interval of FIG. 4. In the continuous mode, a V2X device may continuously receive operation information and safety-related service information of multi-channels from a specified CCH or SCH or may perform exchange of information between a service provider and a user.

(c) Altering mode: In the altering mode, each vehicle or all the vehicles may receive operation information and safety-related service/information of multi-channels or may perform a negotiation process for information exchange between a service provider and a user during the CCH interval. In the altering mode, each of all the vehicles performs a service/information exchange between the service provider and the user during the SCH interval. In the altering mode, a V2X device may perform communication via the CCH and the SCH in an alternate manner during configured CCH and SCH intervals.

(d) Extended mode: In the extended mode, communication during the CCH interval and the SCH interval may be performed as in the altering mode. However, service/information exchange during the SCH interval may also be performed during the CCH interval. As an embodiment, a V2X device in the extended mode may transmit and receive control information during the CCH interval; when the V2X device enters the SCH interval, it may maintain the SCH interval until service/information exchange is terminated.

(e) Immediate mode: In the immediate mode, a V2X device may perform communication as in the altering mode and/or extended mode. However, if negotiation for information exchange is completed during the CCH interval, a V2X device in the immediate mode may initiate information exchange by immediately performing channel switching to a specified SCH instead of waiting for the CCH interval to be terminated. As shown in FIG. 4, the extended mode and the immediate mode may be used together.

In the channel coordination modes of FIG. 4, management information of multi-channels and information exchange and negotiation for service provision may be performed only via the CCH during the CCH interval. Reception of safety-related service and information or negotiation for information exchange between a service provider and a user may also be performed only via the CCH during the CCH interval.

A guard interval may be included between the CCH interval and the SCH interval. A guard interval may secure time needed for synchronization when a communication device performs frequency change or channel change. At the time of channel change, hardware timer operation may be initiated by a sync signal obtained from Coordinated Universal Time (UTC)-based estimation. Channel synchronization may be performed at 1 Pulse Per Second (PPS) intervals by using the UTC as a reference signal.

As an embodiment, a sync interval may include the CCH interval and the SCH interval. In other words, one sync interval may include two time slots, and each of the CCH interval and the SCH interval may correspond to time slot 0 and time slot 1. The start of the sync interval may coincide with the start of the common time reference second. During one second, an integer multiple of the sync interval may be included.

A V2X device may perform communication by using the Multi-channel Operation (MCO) technique employing multi-antennas. As an embodiment, the ETSI MCO design specified in the ETSI TS 102646-4-2 mainly considers the following objectives.

A Channel Access (CA) method that effectively uses channel resources in multi-channels by using multi-antennas should be provided.

A mechanism should be provided, which allows a V2X device to effectively listen to a Service Announcement Message (SAM) providing V2X service information and to switch to the corresponding announced service channel.

A mechanism should be provided, which minimizes the interference effect between adjacent channels occurred when the same vehicle performs V2X transmission and reception by using two or more multi-antennas and adjacent channels.

The Control Channel (CCH) is a reference channel to which traffic safety-related messages such as Cooperative Awareness Message (CAM), Decentralized Environmental Notification Message (DENM), Topology (TOPO), and MAP are transmitted. Other safety messages not fully transmitted to the CCH may be provided through the SCH. If a safety message of a new type is added, the additional safety message may be provided through the SCH.

The SAM announces a V2X service provided through the Service Channel (SCH), where the SAM may be provided through a well-known reference channel. For example, information on a V2X service provided in the ITS-G5A/B/D channel band may be provided through the SAM via a reference CCH. However, since provision of a V2X service through the CCH may affect provision of a safety message, the service may not be provided through the CCH. The information on a V2X service provided in each channel band may also be provided via an alternate reference SCH arbitrarily specified in the channel band through the SAM.

Hereinafter, a multi-channel traffic congestion control method in consideration of the ACI effect will be described. Hereinafter, 1) a method of operating an interference observation window (IOW), 2) a congestion control reference channel selection method and a congestion control reference CBR configuration method using multi-channel CBR information observed in the interference observation window, and 3) a transmission channel congestion control method using the congestion control reference CBR will be described.

Channel busy ratio (CBR) information is traffic load/load state information defined as a ratio of a channel busy section to an observation section. The CBR information may be used to determine the channel busy state for vehicles in the same network. The CBR information may indicate a time-dependent value of 0 or more and 1 or less indicating a fraction of a time when the corresponding channel is busy. Hereinafter, a CBR value may be referred to as CBR.

FIG. 5 illustrates a traffic congestion control method according to an embodiment of the present disclosure.

FIG. 5(a) illustrates a channel congestion control method for a single channel, and FIG. 5(b) illustrates a channel congestion control method for multi-channels.

In FIG. 5(a), the V2X communication device acquires CBR information for a transmission channel (a-S5010), and performs channel congestion control using the CBR of the transmission channel (a-S5020). The V2X communication device measures the CBR in a service transmission channel and then performs the channel congestion control using the measured CBR value.

In FIG. 5(b), the V2X communication device configures the size W of an interference observation window (b-S5010). The V2X communication device acquires the CBR information for multi-channels of the interference observation window (b-S5020). The V2X communication device selects a congestion control reference channel from the interference observation window and configures a congestion control reference CBR (b-S5030). The V2X communication device performs a transmission channel congestion control using the congestion control reference CBR (b-S5040).

In the case of FIG. 5(b), multi-channel CBR information is acquired using the interference observation window compared to FIG. 5(a), and processes of selecting the congestion control reference channel required for channel congestion and configuring the congestion control reference CBR are additionally performed. The operation of FIG. 5(b) will be described in detail below.

FIG. 6 illustrates an ACI effect of a single channel according to an embodiment of the present disclosure.

The ACI is generated by interaction between adjacent channels. As shown in FIG. 6, communication of transmission channel 3 (CH3) may act as inter-channel interference to adjacent channels, channels 1, 2, 4, and 5. In addition, the communication of channel 2 and channel 4 may act as interference to the communication of channel 3.

FIG. 6 is a diagram illustrating the ACI effect in the case of single channel communication. That is, when the V2X communication device selects only one channel to transmit and receive services, there may be no interference from adjacent channels. Therefore, the V2X communication device may perform channel traffic congestion control using only CBR information for a corresponding channel.

FIG. 7 illustrates an ACI effect when a service is transmitted using a plurality of channels according to an embodiment of the present disclosure.

In the case of FIG. 7(a), a service is provided through multi-channels. Accordingly, interference for adjacent channels CH1, CH2, CH4, and CH5 from channel 3, which is a transmission channel, and interference for the transmission channel of the adjacent channels exist. In a sensing-based V2X communication system using channel clear assessment (CCA), the ACI affects CBR, which is an index indicating a channel congestion state according to the amount of interference.

The CCA may be used as a threshold to determine an idle state and a busy state of the channel. The V2X communication device determines the channel as the BUSY state when received signal strength indication (RSSI) measured in each channel is greater than the CCA, and determines the channel as the IDLE state when the measured RSSI is less than the CCA.

FIG. 7(b) illustrates an effect that an ACI effect acts on the transmission channel CBR and the adjacent channel CBR. When a service is transmitted on channel 3, which is a transmission channel, nearby vehicles using adjacent channels (CH2, CH4) within the communication range of the same network are affected by the ACI from channel 3. Therefore, if the amount of the ACI is greater than the CCA, the channel is determined to be BUSY, and as a result, the CBR of the adjacent channel increases. That is, in order to effectively perform service provision and congestion control using the multi-channels, the effect of the ACI must be considered.

Hereinafter, a method of operating the interference observation window will be described.

FIG. 8 illustrates an interference observation window according to an embodiment of the present disclosure.

As described above, in order to effectively control multi-channel traffic congestion, CBR information for adjacent channels may be required, and an interference observation window may be used as a method of acquiring the CBR information. The size of the interference observation window may be configured to include the adjacent channels based on a service transmission channel. The interference observation window acquires the CBR information for each channel in the window for analysis of an inter-channel ACI effect. The size of the interference observation window may be determined or adjusted in consideration of the ACI effect that the service transmission channel acts on the adjacent channel.

FIG. 8(a) illustrates an embodiment of an interference observation window having an area/size of 2, FIG. 8(b) illustrates an embodiment of an interference observation window having an area/size of 3, FIG. 8(c) illustrates an embodiment of an interference observation window having an area/size of 4, and FIG. 8(d) illustrates an embodiment of an interference observation window having an area/size of 5, respectively.

FIG. 8(a) illustrates an example of an interference observation window with W=2, and illustrates a case where an ACI exceeding CCA is caused from one adjacent channel FIG. 8(b) illustrates an embodiment of an interference observation window with W=3, and illustrates a case where an ACI exceeding CCA is caused by two adjacent channels on both sides of a service transmission channel FIG. 8(c) illustrates an embodiment of an interference observation window with W=4, and illustrates a case where an ACI exceeding CCA is caused from three channels adjacent to both sides of a service transmission channel. FIG. 8(d)

illustrates an embodiment of an interference observation window with W=5, and illustrates a case where an ACI exceeding CCA is caused from four channels adjacent to both sides of a service transmission channel.

The area/size of the interference observation window may be configured in units of channels. That is, in the multi-channel environment as shown in FIG. 3, the area/size of the interference observation window covering one channel may be indicated as 1, and the area/size of the interference observation window covering n channels may be indicated as n.

Hereinafter, a congestion control reference channel selection method and a congestion control reference CBR configuration method using multi-channel CBR information observed in an interference observation window will be described.

As described above, during service transmission, not only the CBR of the transmission channel but also the CBR of the adjacent channel increases together due to the ACI effect. Therefore, the service transmission should be performed in consideration of the effect on the adjacent channel CBR. For example, when the CBR for the transmission channel is low but the CBR for the adjacent channel is high, if there is no effect of the ACI, the channel usage rate may be increased by using the CBR information in the transmission channel. On the other hand, if there is an effect of the ACI, an increase in the channel usage rate causes an increase in the CBR of the adjacent channel, and consequently, decreases the service transmission rate in the adjacent channel. The channel usage rate/service transmission rate may be controlled by controlling the number of service transmissions or the service transmission period. For example, the channel usage rate may be increased by increasing the number of service transmissions (service transmission rate) or decreasing the service transmission period. In addition, when there is a target CBR for each channel (or there is a maximum allowed CBR), there may be a problem that the target CBR is exceeded due to service transmission of an adjacent channel.

As a result, in order to provide fairness in the use of multi-channels, the service rate in the transmission channel must be determined in consideration of the CBR of the adjacent channel. The present disclosure proposes various methods of configuring the congestion control reference channel and the congestion control reference CBR, which are a reference for determining the service transmission rate in the transmission channel in the interference observation window. The congestion control reference channel and the service control channel may be the same or different. A channel that does not perform service transmission or is not used for a certain time within the interference observation window is considered as a nulling channel, and may be excluded from the process of selecting the congestion control reference channel regardless of the observed CBR value.

1. First Congestion Control Reference Channel Selection Method

In a first congestion control reference channel selection method, it is assumed that the priority of each channel is the same, and it is assumed that CBR values of each channel are the same in the interference observation window. In the first method, a channel having a maximum CBR value may be selected as the congestion control reference channel, and a CBR value of the corresponding channel may be configured as the congestion control reference CBR. The first method may be expressed as Equation 1 below.

$$CBR_{ref} = \max_{j}(CBR_j), j = 0, 1, \ldots, W-1 \quad \text{[Equation 1]}$$

In Equation 1, j represents the j-th channel in the interference observation window. The order of the channels in the window increases sequentially from j=0 to j=W−1. $CBR_j$ represents the CBR value of the j-th channel. $CBR_{ref}$ represents the congestion control reference CBR value. A channel having the $CBR_{ref}$ is selected/determined as the congestion control reference channel. When there are a plurality of channels having the same maximum CBR value, one channel may be randomly selected as the congestion control reference channel.

FIG. 9 illustrates a first congestion control reference channel selection method according to an embodiment of the present disclosure.

In FIG. 9, the size of the interference observation window is 3. In FIG. 9, a transmission channel is CBR1, and CBRs of adjacent channels are CBR=0 and CBR=2, respectively. As described in Equation 1 and above, the channel having the largest CBR value of 2 becomes the congestion control reference channel ($CBR_{ref}$), and the CBR value of the corresponding channel (CBR=2) becomes the congestion control reference CBR value.

2. Second Congestion Control Reference Channel Selection Method

In a second congestion control reference channel selection method, it is assumed that the priority of each channel is different, and it is assumed that each channel has a different target CBR for each priority. For example, a priority channel or a control channel is regarded as a channel having the highest priority, and other channels are regarded as a channel having a low priority.

In the second method, a channel having the highest priority may be selected as the congestion control reference channel, and a CBR of a corresponding channel may be determined as the congestion control reference CBR. When there are two or more channels having the same priority, a channel having a maximum CBR value may be selected as the congestion control reference channel. When a plurality of channels having the same priority have the same CBR, one randomly selected channel may be the congestion control reference channel.

FIG. 10 illustrates a second congestion control reference channel selection method according to an embodiment of the present disclosure.

In FIG. 10, the size of the interference observation window is 3. In FIG. 10, a primary channel/CCH is included in an adjacent channel of a transmission channel. Accordingly, a channel of the primary channel/CCH channel is selected as the congestion control reference channel. In addition, the CBR value (CBR2) of the congestion control reference channel becomes the congestion control reference CBR value.

FIG. 11 is a flowchart illustrating a second congestion control reference channel selection method according to an embodiment of the present disclosure.

The V2X communication device configures a size (W) of an interference observation window (S11010). The V2X communication device acquires CBR information for multi-channels through the configured interference observation window (S11020).

If there is a primary channel or a CCH channel among channels included in the interference window (S11030), the V2X communication device may select the corresponding channel as a congestion control reference channel, and configure the CBR of the corresponding channel as a congestion control reference CBR (S11040). The V2X communication device performs transmission channel congestion control using the congestion control reference CBR (S11050).

If there is no primary channel or CCH channel among channels included in the interference window (S11030), the V2X communication device may select the congestion control reference channel, and configure the CBR of the corresponding channel as the congestion control reference CBR (S11060). If there is no primary channel or CCH channel, the V2X communication device may configure a reference channel and a reference CBR based on the above-described first congestion control reference channel selection method. In addition, the V2X communication device performs the transmission channel congestion control using the congestion control reference CBR (S11070).

3. Additional Congestion Control Reference Channel Selection Methods

Hereinafter, various congestion control reference channel selection methods that can operate based on the above-described first and second methods will be described.

As an embodiment, a channel having a maximum CBR among weighted CBRs in consideration of channel priority may be selected as a congestion control reference, and the weighted CBR or the CBR of the corresponding channel may be configured as the congestion control reference CBR. The weight may be configured differently according to the priority of the channel.

Different target CBRs may be configured for the case where the congestion control reference channel selected in the interference observation window is the same as a service transmission channel and for different cases. For example, In the case where the primary channel is selected as the congestion control reference channel in the interference observation window, when the congestion control reference channel and the service transmission channel are the same, a high CBR value may be configured, and when the congestion control reference channel and the service transmission channel are different, a low CBR value may be configured. This is to prevent or limit the CBR value of the primary channel from increasing due to service transmission of an adjacent channel having a low priority.

As an embodiment, when the target CBR of each channel is not the same in the interference observation window, a channel having the smallest or largest error between the target CBR and the measured CBR may be selected as the congestion control reference channel.

As an embodiment, the congestion control reference channel may be determined as in Equation 2.

$$CBR_{ref} = (1/W)\Sigma_j CBR_j \quad \text{[Equation 2]}$$

If the target CBR of each channel is the same in the interference observation window, as in Equation 2, the average CBR for multi-channels may be configured as the congestion control reference CBR. In this case, the congestion control reference channel may not be selected.

As an embodiment, the congestion control reference channel may be determined as in Equation 3.

$$CBR_{ref} = \min_j CBR_j, \ j = 0, 1, \ldots, W - 1 \quad \text{[Equation 3]}$$

If the target CBR of each channel is the same in the interference observation window, as in Equation 3, a channel having the minimum CBR value may be selected as the congestion control reference channel, and the CBR value of the corresponding channel may be configured as the congestion control reference CBR.

As an embodiment, the congestion control reference channel may be determined as shown in Equation 4.

$$CBR_{ref} = \beta \max_j (CBR_j), \ j = 0, 1, \ldots, W - 1, 0 < \beta \le 1 \quad \text{[Equation 4]}$$

When a channel selected as the congestion control reference channel and the service transmission channel are different in the interference observation window, a CBR weighted for a CBR of the congestion control reference channel may be selected as the congestion control reference CBR. The weight is indicated by β in Equation 4. The purpose of using the weighted CBR is to alleviate the dependence on the CBR of the adjacent channel for determining the service transmission rate in the transmission channel. When the channel selected as the congestion control reference channel and the service transmission channel are the same in the interference observation window, the reference channel may be selected by the above-described second congestion control reference channel selection methods.

Hereinafter, a method of controlling the service transmission rate in the transmission channel will be described using the congestion control reference CBR configured according to the above-described method. As a technology for controlling traffic congestion in the service transmission channel, a congestion control method and an adaptive transmission rate control method using a decentralized congestion control (DCC) state-machine technology will be described.

FIG. 12 illustrates a DCC state machine and a channel congestion control method thereof according to an embodiment of the present disclosure.

FIG. 12 is a description of an operation of the DCC state machine using CBRref and a channel state defined in each state/state.

In the example of FIG. 12, if the CBR value measured for 1 second is less than 0.15, the channel is determined to be in an idle/"Relaxed" state, and transmission is performed based on transmission parameters defined in the idle state. The transmission parameters defined in the idle state are transmission power (TxPower)=33 dBm, reception sensitivity (RxSensitivity)=95 dBm, transmission period (Frequency)=25 Hz, and transmission data rate (PHYRate)=3 Mbps.

In the example of FIG. 12, if the CBR value measured for 1 second is more than 0.15 and less than 0.4, the channel is determined to be in an active/"Active" state, and transmission is performed based on transmission parameters defined in the active state. The transmission parameters defined in the active state are transmission power (TxPower)=23 dBm, reception sensitivity (RxSensitivity)=85 dBm, transmission period (Frequency)=2 Hz, transmission data rate (PHYRate) =6 Mbps.

In the example of FIG. 12, if the CBR value measured for 1 second is 0.4 or more, the channel is determined to be in a restricted/"Restrictive" state, and transmission is performed based on transmission parameters defined in the restricted state. The transmission parameters defined in the restricted state are transmission power (TxPower)=10 dBm, reception sensitivity (RxSensitivity)=65 dBm, transmission period (Frequency)=1 Hz, transmission data rate (PHYRate) =12 Mbps.

In FIG. 12, as the CBR state is changed to idle=>active=>restrictive, the channel state becomes worse, and thus, transmission power, reception sensitivity, message transmission period, and transmission data rate are decreased. On the other hand, as the CBR state measured for 5 seconds is changed to restrictive=>active=>idle, the channel state improves, thus, transmission power, reception sensitivity, message transmission period, and transmission data rate are increased.

The DCC state machine using CBRref in FIG. 12 is similar to the control method described in ETSI TS 102687, but when the service transmission channel and the congestion control reference channel are different, there is a difference in that the CBR value used in the service transmission channel is operated using CBR information of the adjacent channel.

The adaptive transmission rate control method may be performed as shown in Equation 5 below.

$$r_i(t)=(1-\alpha)r_i(t-1)+\beta(CBR_{target}-CBR_{ref}), 0<\alpha<1, \beta>0 \quad \text{[Equation 5]}$$

In Equation 5, CRBtarget represents the target CBR of the congestion control reference channel, and CBRref represents the congestion control reference CBR. The adaptive transmission rate control method is similar to the existing technology, but when the service transmission channel and the congestion control reference channel are different, there is a difference in that the transmission rate of the service transmission channel is operated using the CBRtarget and CBRref of the adjacent channel.

FIG. 13 illustrates a configuration of a V2X communication device according to an embodiment of the present disclosure.

In FIG. 13, the V2X communication device 13000 may include a communication unit 13010, a processor 13020, and a memory 13030.

The communication unit 13010 may be connected to the processor 13020 to transmit/receive radio signals. The communication unit 13010 may up-convert the data received from the processor 13020 into a transmission/reception band to transmit a signal or down-convert the received signal. The communication unit 13010 may implement at least one operation of a physical layer and an access layer.

The communication unit 13010 may include a plurality of sub RF units to communicate according to a plurality of communication protocols. For example, communication unit 13010 may perform data communication, based on dedicated short range communication (DSRC), an ITS-G5 wireless communication technology based on a physical transmission technology of the IEEE 802.11 and/or 802.11p standards, a 2G/3G/4G (LTE)/5G wireless cellular communication technology including satellite/broadband wireless mobile communication, a broadband terrestrial digital broadcasting technology such as DVB-T/T2/ATSC, a GPS technology, and an IEEE WAVE technology. The communication unit 13010 may include a plurality of transceivers implementing each communication technology. In addition, one transceiver of the plurality of transceivers may access to the control channel, and another transceiver may access to the service channel.

The processor 13020 may be connected to the communication unit 13010 to implement the operation of the layers according to the ITS system or the WAVE system. The processor 13020 may be configured to perform operations according to various embodiments of the present disclosure according to the above-described drawings and description. In addition, at least one of a module, data, program, or software that implements the operation of the V2X communication device 13000 according to various embodiments of the present disclosure may be stored in the memory 13030 and executed by the processor 13020.

The memory 13030 is connected to the processor 13020, and stores various information for driving the processor 13020. The memory 13030 may be included inside the processor 13020 or installed outside the processor 13020 and connected to the processor 13020 by known means.

The processor 13020 of the V2X communication device 13000 may perform the multi-channel congestion control operation described in the present disclosure. The multi-channel congestion control operation of the V2X communication device 13000 will be described below.

FIG. 14 illustrates a multi-channel congestion control method of a V2X communication device according to an embodiment of the present disclosure.

The V2X communication device may configure an interference observation window (S14010).

The V2X communication device may configure the interference observation window based on ACI of a transmission channel or multi-channels, as described with reference to FIGS. 6 to 8. A size of the interference observation window may be configured based on an area of one channel among the pre-configured multi-channels. For example, when a bandwidth of one channel of the multi-channels is 10 MHz, the size of the interference observation window may be expressed as a natural number, and in this case, the size of the window may correspond to a product of the bandwidth and the natural number. The interference observation window may cover the transmission channel and at least one adjacent channel.

The V2X communication device may acquire CBR information for the multi-channels covered by the interference observation window (S14020).

The CBR information for the multi-channels may include a CBR value for each of at least one channel covered by the interference observation window. That is, when the size of the interference observation window is 3, the CBR information for the multi-channels may include CBR values for three channels.

The V2X communication device may configure a reference CBR for congestion control (S14030).

The V2X communication device may configure the reference CBR based on the CBR information for the multi-channels. That is, the configuring the reference CBR may further include configuring a reference channel for the congestion control. The reference channel may correspond to one of the multi-channels covered by the interference observation window. The reference channel may be the transmission channel or an adjacent channel of the transmission channel.

The V2X communication device may configure the reference channel based on the CBR information for the multi-channels, and may configure the reference CBR based on the reference channel. At least one configuration of the reference channel or the reference CBR may be performed as described above. For example, when a target CBR of the multi-channels covered by the interference observation window is the same, a channel having a maximum CBR among the multi-channels may be configured as the reference channel, and the CBR of the reference channel may be configured as the reference CBR. As another example, a channel having a higher priority among the multi-channels may be configured as the reference channel, and the CBR of the reference channel may be configured as the reference CBR. As another example, when the multi-channels have the same priority, a channel having a maximum CBR among the multi-channels may be configured as the reference channel, and the CBR of the reference channel may be configured as the reference CBR.

The V2X communication device may perform congestion control for the transmission channel based on the reference CBR (S14040).

As described in FIG. 12, the V2X communication device may perform congestion control for the transmission channel by adjusting at least one of transmission power (Tx-Power), reception sensitivity (RxSensitivity), transmission period (Frequency), or transmission data rate (PHYRate).

The following is a summary of the multi-channel congestion control method considering the above-described ACI effect.

(i) Interference Observation Window (IOW) Operation

The interference observation window may be configured to include channels adjacent to both sides based on a service (or message) transmission channel.

The interference observation window is operated for the purpose of observing and acquiring CBR (Channel Busy Ratio) for a service transmission channel and the CBR information for the adjacent channel.

Using the CBR information for the multi-channels observed in the interference observation window, reference channel (reference channel for multichannel congestion control) selection and reference CBR (reference CBR for multichannel congestion control) for multi-channel traffic congestion control may be configured.

A congestion control reference channel and the service transmission channel may be the same or different in the process of multi-channel traffic congestion control operation.

A channel that has not transmitted a service for a certain period of time within the interference observation window or has not been used may be regarded as a nulling channel and may be excluded from the process of selecting the congestion control reference channel regardless of the observed CBR value.

A multi-channel traffic congestion control function is performed using a congestion control reference CBR configured in the service transmission channel.

(ii-a) Congestion Control Reference Channel Selection Method-1:

When the target CBR (or maximum allowed CBR) value of each channel is the same in the interference observation window, a channel having the maximum CBR value may be selected as the congestion control reference channel, and the CBR value in the corresponding channel may be configured as the congestion control reference CBR.

When there are two or more channels having the same maximum CBR, one channel may be randomly selected as the congestion control reference channel.

(ii-b) Congestion Control Reference Channel Selection Method-2:

When there is a channel (e.g. primary channel, control channel) having a high priority in the interference observation window, the channel having the high priority may be selected as the congestion control reference channel, and the CBR in the corresponding channel may be configured as the congestion control reference CBR.

When there are two or more channels having the same priority, a channel having a maximum CBR value may be selected as the congestion control reference channel.

When the CBR for two or more channels having the same priority is the same, one channel may be randomly selected as the congestion control reference channel.

(ii-c) Congestion Control Reference Channel Selection Method-3:

Various congestion control reference channel selection method techniques that may be derived based on the congestion control reference channel selection method-½ may be additionally operated.

The multi-channel traffic congestion control function may be performed by using the congestion control reference CBR configured in the service transmission channel of the interference channel window.

Traffic congestion control in the service transmission channel may be operated using a congestion control technique using a state-machine technique described in the existing standard and a congestion control technique using an adaptive technique.

The embodiments described above are combinations of constituting elements and features of the present disclosure in a predetermined form. Each individual element or feature has to be considered as optional except where otherwise explicitly indicated. Each individual element or feature may be implemented solely without being combined with other elements or features. Also, it is also possible to construct the embodiments of the present disclosure by combining a portion of the elements and/or features. A portion of a structure or feature of an embodiment may be included in another embodiment or may be replaced with the corresponding structure or feature of another embodiment. It should be clearly understood that the claims which are not explicitly cited within the technical scope of the present disclosure may be combined to form an embodiment or may be included in a new claim by an amendment after application.

The embodiments of the present disclosure may be implemented by various means such as hardware, firmware, software, or a combination thereof. In the case of hardware implementation, one embodiment of the present disclosure may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present disclosure may be implemented in the form of modules, procedures, functions, and the like which perform the functions or operations described above. Software codes may be stored in the memory and activated by the processor. The memory may be located inside or outside of the processor and may exchange data with the processor by using various well-known means.

It is apparent for those skilled in the art that the present disclosure may be embodied in other specific forms without departing from the essential characteristics of the present disclosure. Therefore, the detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

MODE FOR INVENTION

It should be clearly understood by those skilled in the art that the present disclosure may be changed or modified in various ways without departing from the technical principles and scope of the present disclosure. Therefore, it is intended that the present disclosure includes changes and modifications of the present disclosure defined by appended claims and provided within their equivalent scope.

The present disclosure describes both of the apparatus disclosure and the method disclosure, and descriptions of the respective disclosures may be applied in a supplementary manner.

Various embodiments have been described in their best mode for implementing the present disclosure.

INDUSTRIAL APPLICABILITY

The present disclosure is used in a series of vehicle communication applications.

It should be clearly understood by those skilled in the art that the present disclosure may be changed or modified in various ways without departing from the technical principles and scope of the present disclosure. Therefore, it is intended that the present disclosure includes changes and modifications of the present disclosure defined by appended claims and provided within their equivalent scope.

The invention claimed is:

1. A multi-channel congestion control method considering adjacent channel interference (ACI), comprising:
configuring an interference observation window (IOW) based on the ACI of a transmission channel;
acquiring channel busy ratio (CBR) information for multi-channels covered by the IOW;
configuring a reference CBR for congestion control based on the CBR information for the multi-channels; and
performing the congestion control for the transmission channel based on the reference CBR,
wherein the configuring a reference CBR further includes configuring a reference channel for the congestion control,
wherein the reference channel corresponds to one of the multi-channels covered by the IOW, and
wherein based on a target CBR of the multi-channels covered by the IOW being the same, a channel having a maximum CBR among the multi-channels is configured as the reference channel, and a CBR of the reference channel is configured as the reference CBR.

2. The method of claim 1, wherein based on a priority of the multi-channels being the same, a channel having a maximum CBR among the multi-channels is configured as the reference channel, and a CBR of the reference channel is configured as the reference CBR.

3. The method of claim 1, wherein the IOW covers the transmission channel and at least one adjacent channel.

4. A communication device, comprising:
a memory configured to store data;
a communication unit configured to transmit and receive a radio signal; and
a processor configured to control the memory and the communication unit,
wherein the processor is configured to:
configure an interference observation window (IOW) based on adjacent channel interference (ACI) of a transmission channel,
acquire channel busy ratio (CBR) information for multi-channels covered by the IOW,
configure a reference CBR for congestion control based on the CBR information for the multi-channels, and
perform the congestion control for the transmission channel based on the reference CBR,
wherein configuration of the reference CBR further includes configuration of a reference channel for the congestion control, and wherein the reference channel corresponds to one of the multi-channels covered by the IOW, and
wherein based on a target CBR of the multi-channels covered by the IOW being the same, a channel having a maximum CBR among the multi-channels is configured as the reference channel, and a CBR of the reference channel is configured as the reference CBR.

5. The device of claim 4, wherein based on a priority of the multi-channels being the same, a channel having a maximum CBR among the multi-channels is configured as the reference channel, and a CBR of the reference channel is configured as the reference CBR.

6. The device of claim 4, wherein the IOW covers the transmission channel and at least one adjacent channel.

* * * * *